United States Patent
Namba

(10) Patent No.: US 6,823,400 B2
(45) Date of Patent: Nov. 23, 2004

(54) METHOD AND APPARATUS FOR SERIAL COMMUNICATIONS BETWEEN A HOST APPARATUS AND OPTIONAL EQUIPMENT HAVING UNIQUE IDENTIFICATION VALUES

(75) Inventor: Kuniharu Namba, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 422 days.

(21) Appl. No.: 09/737,584

(22) Filed: Dec. 18, 2000

(65) Prior Publication Data

US 2001/0029554 A1 Oct. 11, 2001

(30) Foreign Application Priority Data

Dec. 16, 1999 (JP) .......................................... 11-358147

(51) Int. Cl.[7] .................................................. G06F 3/00
(52) U.S. Cl. ........................................... 710/9; 710/19
(58) Field of Search .......................... 710/8–14, 15–19, 710/5, 6, 62; 702/106; G01R 31/00

(56) References Cited

U.S. PATENT DOCUMENTS 5,247,657 A * 9/1993 Myers .......................... 710/12
5,606,515 A * 2/1997 Mockapetris et al. ........ 702/106
5,745,493 A 4/1998 St. Clair
5,920,731 A * 7/1999 Pletl et al. ...................... 710/8

FOREIGN PATENT DOCUMENTS

| JP | 61138177 A | * 6/1986 | ........... G01R/31/00 |
| JP | 9-244986 | 9/1997 | |
| JP | 11-096090 | 4/1999 | |

* cited by examiner

Primary Examiner—Jeffrey Gaffin
Assistant Examiner—Joshua D Schneider
(74) Attorney, Agent, or Firm—Oblon, Spivak, McClelland, Maier & Neustadt, P.C.

(57) ABSTRACT

A method and apparatus for performing serial communication between a host apparatus and a plurality of peripheral devices, such as an optional sheet bank, using an I²C bus. The host apparatus includes a processor connected to the I²C bus. A respective logic circuit is provided in each of the plurality of peripheral devices. The logic circuits are configured to be serially-connectable and communicable with the host apparatus through the I²C bus and to output a unique logic value based on a number of the peripheral devices serially connected to the host apparatus. Further, the host apparatus assigns an identification to each of the plurality of peripheral devices using the unique logic value.

18 Claims, 5 Drawing Sheets

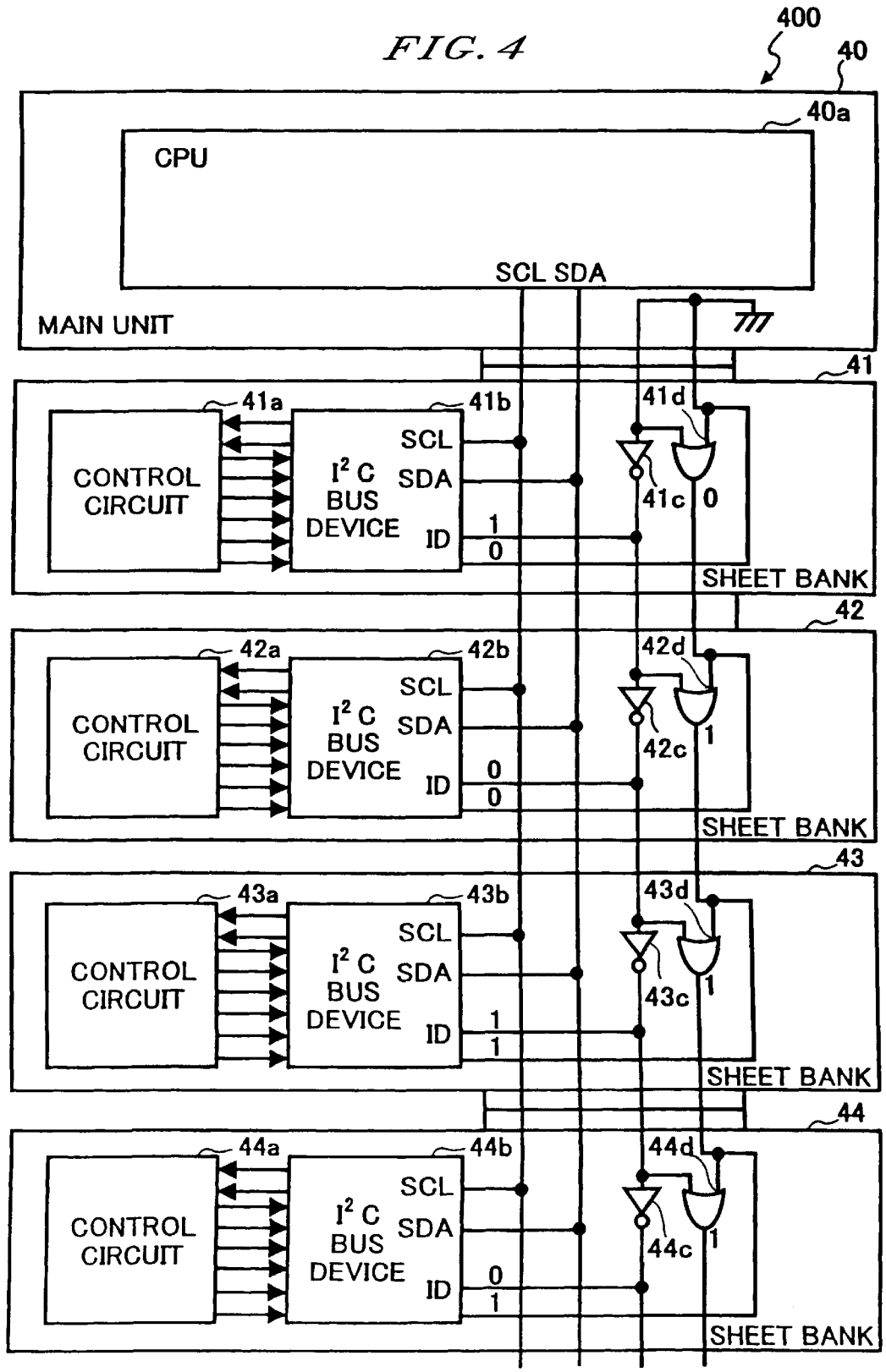

METHOD AND APPARATUS FOR SERIAL COMMUNICATIONS BETWEEN A HOST APPARATUS AND OPTIONAL EQUIPMENT HAVING UNIQUE IDENTIFICATION VALUES

CROSS-REFERENCE TO RELATED APPLICATIONS

This application claims priority to Japanese patent application No. JPAP11-358147 filed on Dec. 16, 1999 in the Japanese Patent Office, the entire contents of which are hereby incorporated by reference.

BACKGROUND

1. Field

The present invention relates to a method and apparatus for serial communications, and more particularly to a method and apparatus for serial communications effectively performed between a host apparatus and optional peripherals.

2. Description of the Related Arts

Many image forming apparatuses, such as copying machines, printers, and so on, have a configuration to allow users to add optional equipment such as an optional sheet bank. For example, a user may install two optional sheet banks in addition to a standard sheet bank, thereby having three sheet banks in total. In many cases, the optional sheet banks are identical to each other and even to the standard sheet bank. Therefore, the image forming apparatus needs to identify each sheet bank.

FIG. 1 shows a configuration of a prior art image forming apparatus 100 including first and second optional sheet banks 11 and 12 which are connected to a main unit 10. In this example, the main unit 10 is provided with at least two sets of requisite signals to be used for the first and second optional sheet banks 11 and 12. One set of signals includes two output signals labeled as S1 and S2 and six input signals labeled as S3 through to S8. This prior art image forming apparatus is configured to be equipped with up to two optional sheet banks, and the set of signals for the second optional sheet bank are arranged to pass through the first optional sheet bank, as shown in FIG. 1. Therefore, each optional sheet bank is provided with 16 signal lines.

In this case, as a number of optional sheet banks is increased, a number of requisite cables, a number of requisite connectors, etc. are also increased which is not desirable from the viewpoint of a cost of equipment.

FIG. 2 shows a configuration of another prior art image forming apparatus 200 including first and second optional sheet banks 21 and 22 which are connected to a main unit 20. In this example, input signals labeled as S3 through to S8 are multiplexed with a plurality of AND gates plus a select signal line S9 so that a total number of signal lines is reduced from 16 to 11.

Thus, the input signals of S3–S8 can be commonly used by the optional sheet banks. However, the output signals of S1–S2 are increased as the number of optional sheet banks is increased, which will lead to a problem similar to the one caused in the case of the prior art image forming apparatus of FIG. 1.

A 2-bit serial I²C (Inter IC) bus is known as a way for serially connecting a plurality of peripherals to a host apparatus. By using the I2C serial bus, a number of signal lines can be decreased. In this case, however, identification of each equipment becomes problematic.

A Published Unexamined Japanese Patent Application No. 9-244986 describes a method of dynamically changing an address of each constituent in order to connect a number of constituents, which is actually of limitless, to the I²C bus, regardless of a number of requisite address lines.

Another Published Unexamined Japanese Patent Application No. 11-96090 describes a method of eliminating a limit for a number of I²C buses to be connected to one I²C bus.

SUMMARY

The present invention provides a novel method of performing serial communications between a host apparatus and a plurality of peripherals using an I²C bus. In one example, a novel method includes the steps of providing, making, and mounting. The providing step provides the host apparatus with a processor connected to the I²C bus. The making step makes a logic circuit. The mounting step mounts the logic circuit on each of the plurality of peripherals. In such a method, the making step makes the logic circuit configured to be serially-connectable and communicable with the host apparatus through the I²C bus. Further, the making step makes the logic circuit configured to output a unique logic value based on a number of the peripherals serially connected upstream relative to the host apparatus so that the host apparatus assigns an identification to each of the plurality of peripherals using the unique logic value.

The above-mentioned novel method may further include a sending the steps of sending a command sequentially to the plurality of peripherals using the identification and checking if an acknowledgement signal is returned from each of the plurality of peripherals so as to recognize an existence of a peripheral.

The above-mentioned novel method may further include the steps of sending a command sequentially to the plurality of peripherals using the identification and checking if an acknowledgement signal is returned from each of the plurality of peripherals so as to detect whether a number of peripherals connected is greater than a maximum number of peripherals connectable to the host apparatus.

The present invention further provides a novel image forming apparatus. In one example, a novel image forming apparatus includes a processor and at least one option sheet bank. The processor is configured to be connected to an I²C bus. Each of the at least one optional sheet bank includes a logic circuit configured to be serially-connectable and communicable with the processor through the I²C bus. This logic circuit is further configured to output a unique logic value based on a number of the above-mentioned at least one optional sheet bank serially connected upstream relative to the processor so that the processor assigns an identification to each of the above-mentioned at least one optional sheet bank using the unique logic value.

The processor may send a command sequentially to the above-mentioned at least one optional sheet bank using the identification and check if an acknowledgement signal is returned from each of the above-mentioned at least one optional sheet bank so as to recognize an existence of an optional sheet bank.

The image forming apparatus may send a command sequentially to the above-mentioned at least one optional sheet bank using the identification and check if an acknowledgement signal is returned from each of the above-mentioned at least one optional sheet bank so as to detect whether a number of the optional sheet banks connected is greater than a maximum number of the optional sheet banks connectable to the image forming apparatus.

BRIEF DESCRIPTION OF THE DRAWINGS

A more complete appreciation of the present application and many of the attendant advantages thereof will be readily obtained as the same becomes better understood by reference to the following detailed description when considered in connection with the accompanying drawings, wherein:

FIG. 4 is a schematic block diagram of another image forming apparatus according to an embodiment of the present invention.

DETAILED DESCRIPTION

Figure 1:
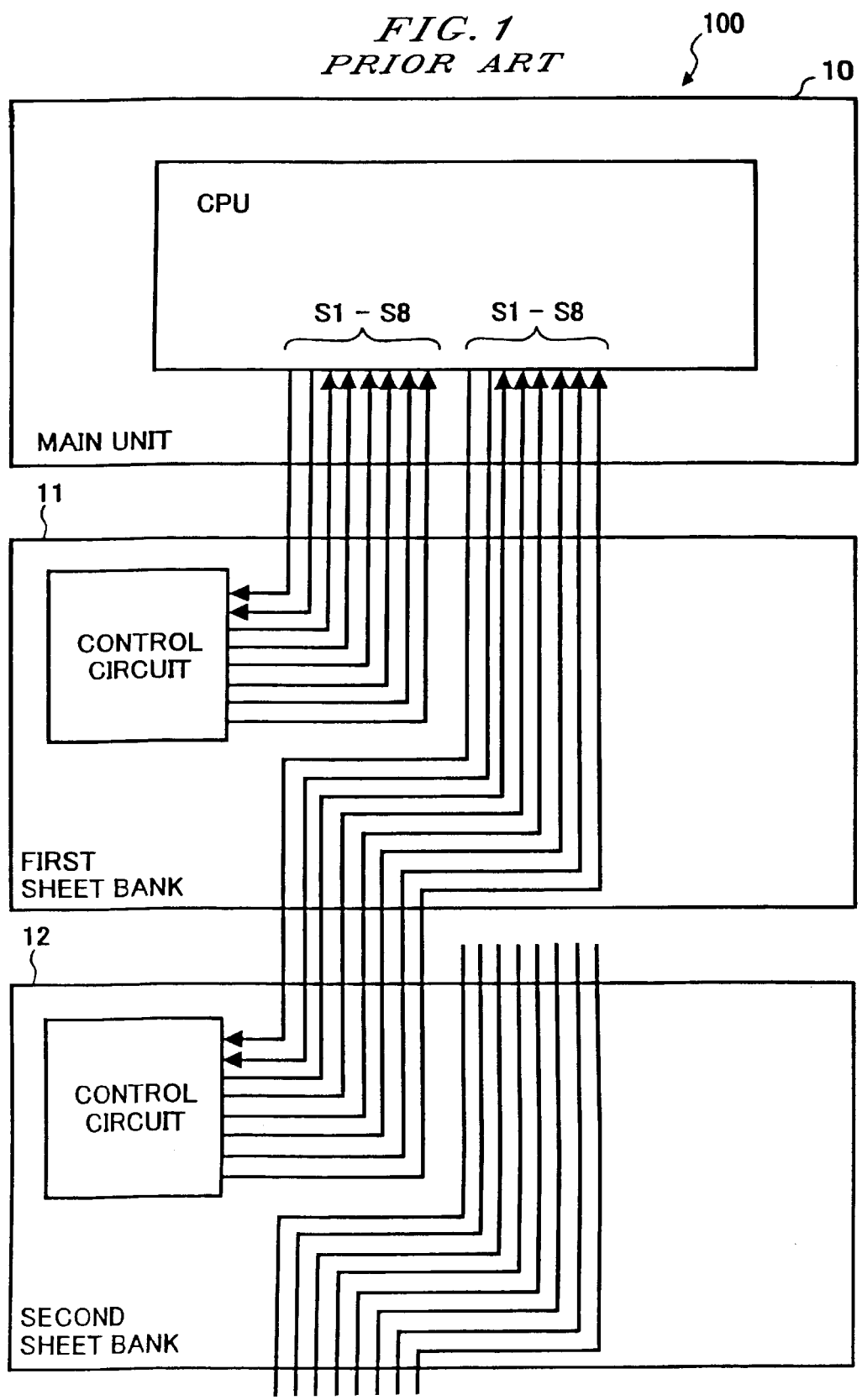
FIG. 1 is a schematic block diagram of a prior art image forming apparatus.

In describing preferred embodiments illustrated in the drawings, specific terminology is employed for the sake of clarity. However, the invention is not intended to be limited to the specific terminology so selected and it is to be understood that each specific element includes all technical equivalents which operate in a similar manner.

Figure 3:
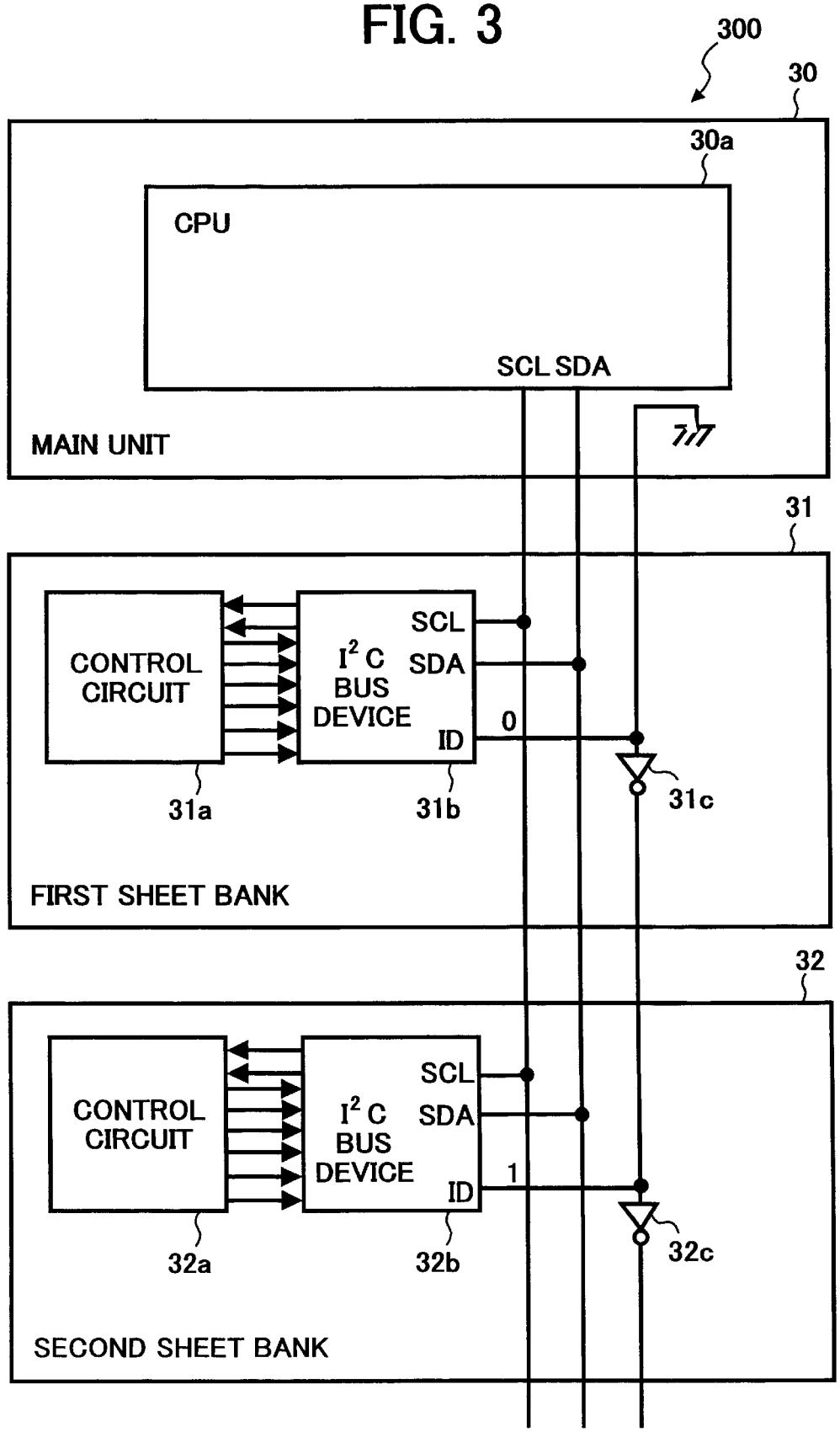
FIG. 3 is a schematic block diagram of an image forming apparatus according to an embodiment of the present invention.

Referring now to the drawings, wherein like reference numeral designate identical or corresponding parts throughout the several views, particularly to FIG. 3, an image forming apparatus 300 using a method for controlling optional equipment according to an embodiment of the present invention is described. As one example, FIG. 3 shows a case in which up to two optional sheet banks are installable in the image forming apparatus 300. Actually, first and second sheet banks 31 and 32 are installed in the image forming apparatus 300 and have electrical connections to a main unit 30 of the image forming apparatus 300. In this image forming apparatus 300, a 2-bit I²C (Inter IC) serial bus including a clock-signal (SCL) line and a data (SDA) line is used for a serial communication between each of the first and second sheet banks 31 and 32 and the main unit 30. The I²C bus is defined by N. V. Philips Gloeilampenfabrieken in the Netherlands.

As shown in FIG. 3, the optional sheet bank 31 includes a control circuit 31a and an I²C-bus-compatible device 31b which are connected to each other with 8 signal lines. Also, the optional sheet bank 32 includes a control circuits 32a and an I²C-bus-compatible device 32b which are connected to each other with 8 signal lines. The I²C-bus-compatible device 31b has a clock-signal terminal (SCL) and a data terminal (SDA). The SCL terminal of the I²C-bus-compatible device 31b is connected to an SCL terminal of a CPU 30a of the main unit 30, through the SCL line of the I²C bus. The SDA terminal of the I²C-bus-compatible device 31b is connected to an SDA terminal of the CPU 30a of the main unit 30, through the SDA line of the I²C bus. Also, the I²C-bus-compatible device 32b has a clock-signal terminal (SCL) and a data terminal (SDA). The SCL terminal of the I²C-bus-compatible device 32b is connected to the SCL terminal of the CPU 30a of the main unit 30, through the SCL line of the I²C bus. The SDA terminal of the I²C-bus-compatible device 32b is connected to the SDA terminal of the CPU 30a of the main unit 30, through the SDA line of the I²C bus.

The sheet banks 31 and 32 include inverters 31c and 32c, respectively. Each of the I²C-bus-compatible devices 31b and 32b further includes at least one identification terminal (ID). In this example, each of the I²C-bus-compatible devices 31b and 32b uses one identification terminal (ID) for determining its identification. The ID terminal of the I²C-bus-compatible device 31b is connected to a single ID line which is grounded in the main unit 30, and the ID terminal of the I²C-bus-compatible device 32b is connected to, via the inverter 31c, the single ID line which is grounded in the main unit 30. Thus, the ID terminals of the I²C-bus-compatible devices 31b and 32b are preset to 0 and 1, respectively, on the basis of the ID information of the I²C-bus-compatible device located at an immediate upstream position. Accordingly, the main unit 30 can selectively communicate with the first and second sheet banks 31 and 32 using these identifications of the I²C-bus-compatible devices 31b and 32b which are 0 and 1.

Figure 2:
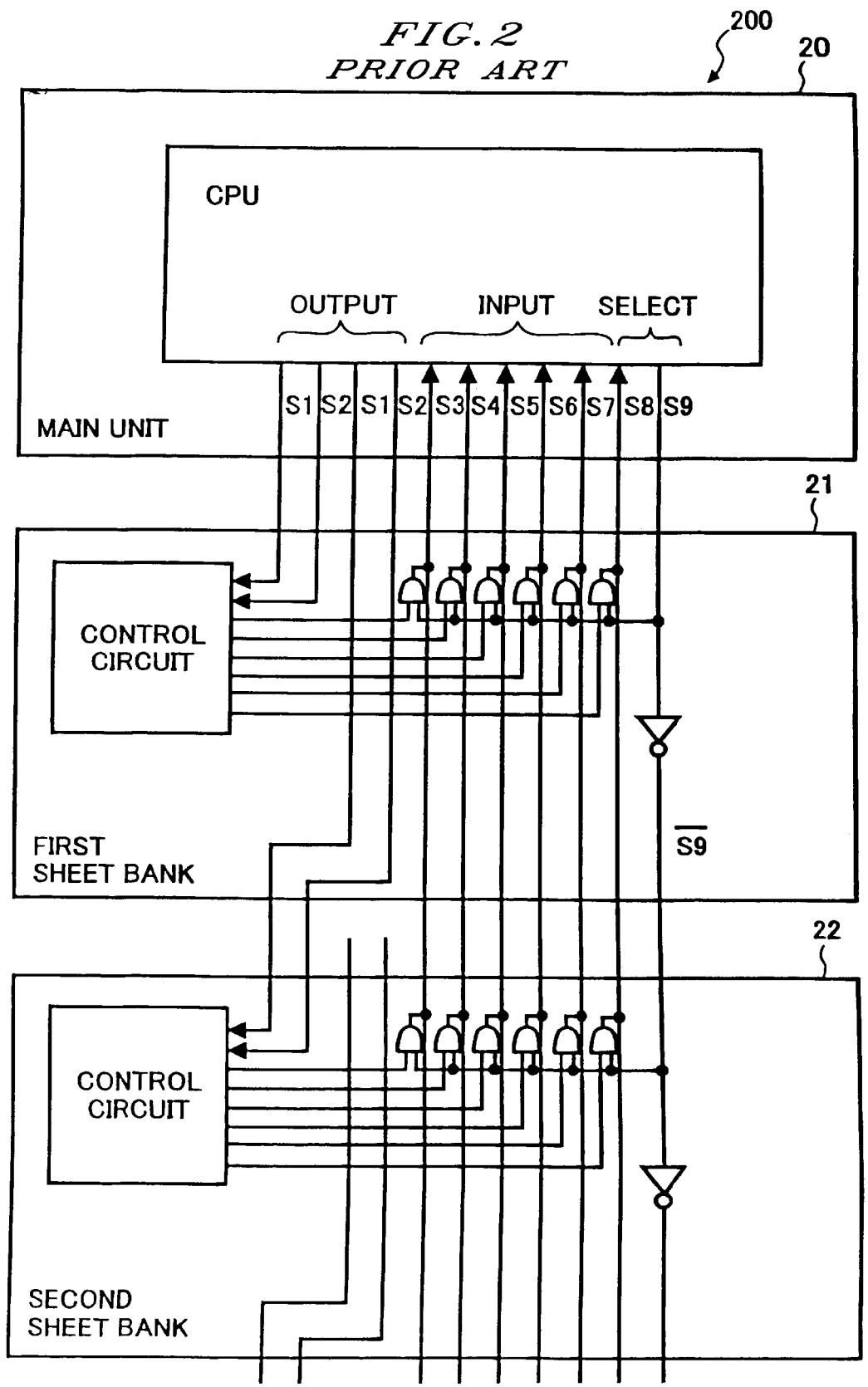
FIG. 2 is a schematic block diagram of another prior art image forming apparatus.

In this way, the image forming apparatus can handle up to two optional sheet bank units with three signal lines instead of using the 16 signal lines of the case shown in FIG. 1 or the 11 signal lines of the case shown in FIG. 2.

The I²C-bus-compatible devices 31b and 32b may be a CPU (central processing unit), an I/O (input and output) expander, or the like.

Referring to FIG. 4, an image forming apparatus 400 using a method for controlling optional equipment according to an embodiment of the present invention is described. FIG. 4 shows a case in which up to four optional sheet banks are installable in the image forming apparatus 400. As shown in FIG. 4, the image forming apparatus 400 is provided with optional sheet banks 41–44 which are configured to have electrical connections to a main unit 40. In this case, the image forming apparatus 400 uses a two-bit-ID configuration and the I²C bus for the serial communication between each of the sheet banks 41–44 and the main unit 40.

As shown in FIG. 4, the optional sheet bank 41 includes a control circuit 41a and an I²C-bus-compatible device 41b which are connected to each other with 8 signal lines. Also, the optional sheet bank 42 includes a control circuits 42a and an I²C-bus-compatible device 42b which are connected to each other with 8 signal lines. Also, the optional sheet bank 43 includes a control circuits 43a and an I²C-bus-compatible devices 43b which are connected to each other with 8 signal lines. Also, the optional sheet bank 44 includes a control circuits 44a and an I²C-bus-compatible devices 44b which are connected to each other with 8 signal lines.

The I²C-bus-compatible device 41b is provided with a clock-signal terminal (SCL) and a data terminal (SDA) which are connected to SCL and SDA terminals, respectively, of a CPU (central processing unit) 40a of the main unit 40. Also, the I²C-bus-compatible device 42b is provided with a clock-signal terminal (SCL) and a data terminal (SDA) which are connected to the SCL and SDA terminals, respectively, of the CPU (central processing unit) 40a of the main unit 40. Also, the I²C-bus-compatible device 43b is provided with a clock-signal terminal (SCL) and a data terminal (SDA) which are connected to the SCL and SDA terminals, respectively, of the CPU (central processing unit) 40a of the main unit 40. Also, the I²C-bus-compatible device 44b is provided with a clock-signal terminal (SCL) and a data terminal (SDA) which are connected to the SCL and SDA terminals, respectively, of the CPU (central processing unit) 40a of the main unit 40.

The sheet bank 41 includes an inverter 41c and an OR gate 41d. Also, the sheet bank 42 includes an inverter 42c and an OR gate 42d. Also, the sheet bank 43 includes an inverter 43c and an OR gate 43d. Also, the sheet bank 44 includes an inverter 44c and an OR gate 44d. These inverters 41c–44c and the OR gates 41d–44d are provided along the 2-bit-ID lines for assigning identifications of the I²C-bus-compatible devices 41b–44b, respectively, so that the CPU 40a of the main unit 40 can perform serial communications using the SCL and SDA lines of the I²C bus. Each of the I²C-bus-compatible devices 41b–44b further includes two identification terminals (IDs).

The inverters 41c–44c determine most significant bits (MSB) of the 2-bit IDs of the I²C-bus-compatible devices 41b–44b, respectively. That is, the inverter 41c determines the MSB of the 2-bit ID of the I²C-bus-compatible device 41b as 1, the inverter 42c determines the MSB of the 2-bit ID of the I²C-bus-compatible device 42b as 0, the inverter 43c determines the MSB of the 2-bit ID of the I²C-bus-compatible device 43b as 1, and the inverter 44c determines the MSB of the 2-bit ID of the I²C-bus-compatible device 44b as 0. The OR gates 41d–44d determine least significant bits (LSB) of the 2-bit IDs of the I²C-bus-compatible devices 41b–44b, respectively. That is, the OR gate 41d determines LSB of the 2-bit ID of the I²C-bus-compatible device 41b as 0, the OR gate 42d determines the LSB of the 2-bit ID of the I²C-bus-compatible device 42b as 0, the OR gate 43d determines the LSB of the 2-bit ID of the I²C-bus-compatible device 43b as 1, and the OR gate 44d determines the LSB of the 2-bit ID of the I²C-bus-compatible device 44b as 1.

Thus, the 2-bit-ID of the I²C-bus-compatible devices 41b–44b are assigned to be as 10, 00, 11, 01, respectively, on the basis of the ID signal sent from the sheet bank located at an immediate upstream position, so that each sheet bank 41–44 thereby has a unique identification value set in accordance with a number of the sheet banks 41–44 connected to the main unit 40 and a relative connecting position of the sheet banks 41–44 connected to the main unit 40. Thereby, the main unit 40 can selectively communicate with the sheet banks 41–44 using these ID signals.

According to the standard specification of the I²C bus, a communication apparatus is required to return an ACK (acknowledgement) signal as a response to a signal received during the communications. Therefore, when an optional sheet bank is installed and accordingly the I²C-bus-compatible device is connected to the CPU 40a of the main unit 40, an ACK signal is returned from the I²C-bus-compatible device to the CPU 40a. But, when an optional sheet bank is not installed and accordingly the I²C-bus-compatible device is not connected to the CPU 40a of the main unit 40, no ACK signal is returned from the I²C-bus-compatible device to the CPU 40a Using this, the CPU 40a of the main unit 40 checks as to which I²C-bus-compatible device returns the ACK signal while sending commands to all the I²C-bus-compatible devices 41–44 by changing the ID signals. Thus, the CPU 40a can recognize which sheet banks are installed based on the ACK signal of the I²C bus without the needs of extra detection tools for detecting the connections of the optional sheet banks.

Figure 5A:
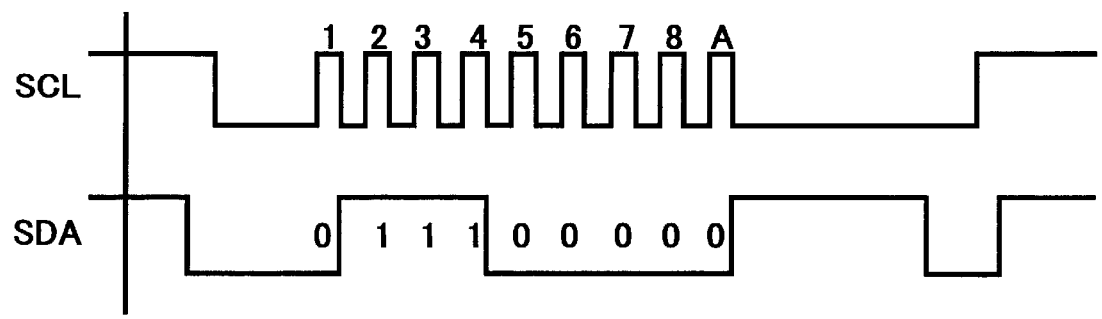
FIGS. 5A and 5B are time charts for showing cases of returning and not returning an ACK signal.
Figure 5B:
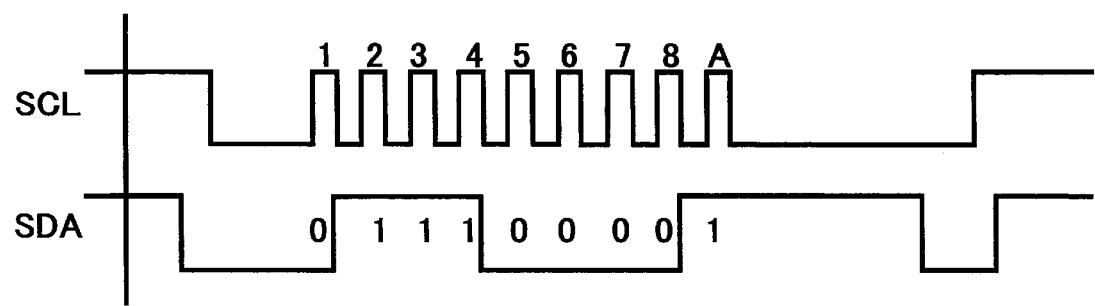

Each of FIGS. 5A and 5B shows a time chart of a case in which the CPU 40a of the main unit 40 is configured to detect the connections of the optional sheet banks using the ACK signal returning from the corresponding optional sheet banks. In FIG. 5A, the SDA signal includes an ACK signal and therefore the CPU 40a of the main unit 40 detects no connection of the corresponding optional sheet bank. In FIG. 5B, the SDA signal includes an ACK signal and therefore the CPU 40a of the main unit 40 detects the connection of the corresponding optional sheet bank.

In addition, in a case when the main unit 40 of FIG. 4 is actually configured to be equipped with up to three optional sheet banks, for example, if an ACK signal is returned from the fourth optional sheet bank, the CPU 40a of the main unit 40 can detect a problematic event in that a number of option apparatuses greater than the maximum allowable number are installed in the image forming apparatus.

Numerous additional modifications and variations of the present application are possible in light of the above teachings. It is therefore to be understood that within the scope of the appended claims, the present application may be practiced otherwise than as specifically described herein.

What is claimed as new and is desired to be secured by Letters Patent of The United States is:

1. A method of performing serial communication between a host apparatus and at least one peripheral device using an I²C bus, comprising:

providing said host apparatus with a processor connected to said I²C bus;

providing a respective I²C-bus-compatible device in each of said at least one peripheral device, wherein each I²C-bus-compatible device is configured to be serially-connectable and communicable with said host apparatus through said I²C bus, and each I²C-bus-compatible device includes a unique identification value set in accordance with a number of peripheral devices connected to the host apparatus and a relative connecting position of said at least one peripheral device serially connected to said host apparatus; and said host apparatus assigning an identification address to each of said at least one peripheral device using said unique identification values.

2. A method as defined in claim 1, further comprising sending a command sequentially to said at least one peripheral device using said identification, and checking if an acknowledgment signal is returned from each of said at least one peripheral device so as to recognize an existence of said at least one peripheral device.

3. A method as defined in claim 1, further comprising sending a command sequentially to said at least one peripheral device using said identification, and checking if an acknowledgment signal is returned from each of said at least one peripheral device so as to detect whether a number of said at least one peripheral device connected is greater than a maximum number of said at least one peripheral device allowed to be connected to said host apparatus.

4. A method of performing serial communication between an image forming apparatus and at least one sheet bank using an I²C bus, comprising:

providing said image forming apparatus with a processor connected to said I²C bus;

providing a respective I²C-bus-compatible device in each of said at least one sheet bank, wherein each I²C-bus-compatible device is configured to be serially-connectable and communicable with said image forming apparatus through said I²C bus, and each I²C-bus-compatible device includes a unique identification value set in accordance with a number of peripheral devices connected to the host apparatus and a relative connecting position of said at least one sheet bank serially connected to said image forming apparatus; and assigning an identification address to each of said at least one sheet bank using said unique identification values.

5. A method as defined in claim 4, further comprising sending a command sequentially to said at least one sheet bank using said identification, and checking if an acknowledgment signal is returned from each of said at least one sheet bank so as to recognize an existence of said at least one sheet bank.

6. A method as defined in claim 4, further comprising sending a command sequentially to said at least one sheet bank using said identification, and checking if an acknowledgment signal is returned from each of said at least one sheet bank so as to detect whether a number of said at least one sheet bank connected is greater than a maximum number of said at least one sheet bank allowed to be connected to said image forming apparatus.

7. An image forming apparatus, comprising:

a processor configured to be connected to an $I^2C$ bus; and at least one peripheral device, wherein each of said at least one peripheral device comprises a $I^2C$-bus-compatible device configured to be serially-connectable and communicable with said processor through said $I^2C$ bus, and each $I^2C$-bus-compatible device outputs a respective unique identification value set in accordance with a number of peripheral devices connected to the host apparatus and a relative connecting position of said at least one peripheral device serially connected to said processor;

and wherein said processor assigns an identification address to each of said at least one peripheral device using said unique identification value.

8. An image forming apparatus as defined in claim 7, wherein said processor sends a command sequentially to said at least one peripheral device using said identification, and checks if an acknowledgement signal is returned from each of said at least one peripheral device so as to recognize an existence of said at least one peripheral device.

9. An image forming apparatus as defined in claim 7, wherein said processor sends a command sequentially to said at least one peripheral device using said identification, and checks if an acknowledgment signal is returned from each of said at least one peripheral device so as to detect whether a number of said at least one peripheral device connected is greater than a maximum number of said at least one peripheral device allowed to be connected to said image forming apparatus.

10. An image forming apparatus as defined in claim 7, wherein said at least one peripheral device includes at least one sheet bank.

11. An image forming apparatus as defined in claim 10, wherein said processor sends a command sequentially to said at least one sheet bank using said identification, and checks if an acknowledgement signal is returned from each of said at least one sheet bank so as to recognize an existence of the at least one sheet bank.

12. An image forming apparatus as defined in claim 10, wherein said processor sends a command sequentially to said at least one sheet bank using said identification, and checks if an acknowledgment signal is returned from each of said at least one sheet bank so as to detect whether a number of said at least one sheet bank connected is greater than a maximum number of said at least one sheet bank allowed to be connected to said image forming apparatus.

13. An image forming apparatus, comprising:

processor means for connecting to an $I^2C$ bus; and at least one peripheral means for connecting to said processor means, wherein each of said at least one peripheral means comprises $I^2C$-bus-compatible means for serially-communicating with said processor means through said $I^2C$ bus, and for outputting a respective unique identification value set in accordance with a number of peripheral devices connected to the host apparatus and a relative connecting position of said at least one peripheral means serially connected to said processor means;

wherein said processor means assigns an identification address to each of said at least one peripheral means using said unique logic value.

14. An image forming apparatus as defined in claim 13, wherein said at least one peripheral means includes at least one sheet bank.

15. An image forming apparatus as defined in claim 13, wherein said processor means further sends a command sequentially to said at least one peripheral means using said identification, and checks if an acknowledgement signal is returned from each of said at least one peripheral means so as to recognize an existence of said at least one peripheral means.

16. An image forming apparatus as defined in claim 13, wherein said processor means sends a command sequentially to said at least one peripheral means using said identification, and checks if an acknowledgment signal is returned from each of said at least one peripheral means so as to detect whether a number of said at least one peripheral means connected is greater than a maximum number of said at least one peripheral means allowed to be connected to said image forming apparatus.

17. An image forming apparatus as defined in claim 14, wherein said processor means further sends a command sequentially to said at least one sheet bank using said identification, and checks if an acknowledgement signal is returned from each of said at least one sheet bank so as to recognize an existence of said at least one sheet bank.

18. An image forming apparatus as defined in claim 14, wherein said processor means sends a command sequentially to said at least one sheet bank using said identification, and checks if an acknowledgment signal is returned from each of said at least one sheet bank so as to detect whether a number of said at least one sheet bank connected is greater than a maximum number of said at least one sheet bank allowed to be connected to said image forming apparatus.

* * * * *